United States Patent
Lee et al.

(10) Patent No.: US 9,755,799 B2
(45) Date of Patent: Sep. 5, 2017

(54) COORDINATING TRANSMISSION OF POSITIONING REFERENCE SIGNALS AND NON-REFERENCE SIGNALS

(71) Applicant: Alcatel-Lucent USA Inc., Murray Hill, NJ (US)

(72) Inventors: Nancy Y. Lee, Morristown, NJ (US); Ruth S. Gayde, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 419 days.

(21) Appl. No.: 14/521,329

(22) Filed: Oct. 22, 2014

(65) Prior Publication Data

US 2016/0119095 A1    Apr. 28, 2016

(51) Int. Cl.
*H04L 5/00* (2006.01)
*H04W 16/00* (2009.01)

(52) U.S. Cl.
CPC .......... *H04L 5/0048* (2013.01); *H04L 5/0073* (2013.01); *H04W 16/00* (2013.01)

(58) Field of Classification Search
CPC .................................................... H04L 5/0073
See application file for complete search history.

(56) References Cited

U.S. PATENT DOCUMENTS

| | | | |
|---|---|---|---|
| 2005/0002369 A1* | 1/2005 | Ro | H04B 1/7083 370/342 |
| 2012/0178482 A1* | 7/2012 | Seo | H04W 56/00 455/501 |
| 2013/0294401 A1* | 11/2013 | Yoon | G01S 5/0215 370/330 |

OTHER PUBLICATIONS

"E-UTRAN OTDOA Intra-Frequency RSTD Measurements", 3GPP TS 36.133 V11.6.0 (Sep. 2013), Sep. 1, 2013, pp. 98-102.
"Positioning Reference Signals", 3GPP TS 36.211 V12.3.0 (Sep. 2014), Sep. 1, 2014, pp. 101-103.

* cited by examiner

*Primary Examiner* — Siming Liu
(74) *Attorney, Agent, or Firm* — Davidson Sheehan LLP

(57) ABSTRACT

A base station coordinates transmission of positioning reference signals and non-reference signals. The base station includes a transceiver to detect a reference signal transmitted by one or more other base stations in one or more physical resource blocks. The base station also includes a processor to identify a pattern of resources allocated to the one or more other base stations based on the one or more physical resource blocks including the reference signal. The transceiver is to bypass transmission of non-reference signals in physical resource blocks indicated by the pattern.

18 Claims, 6 Drawing Sheets

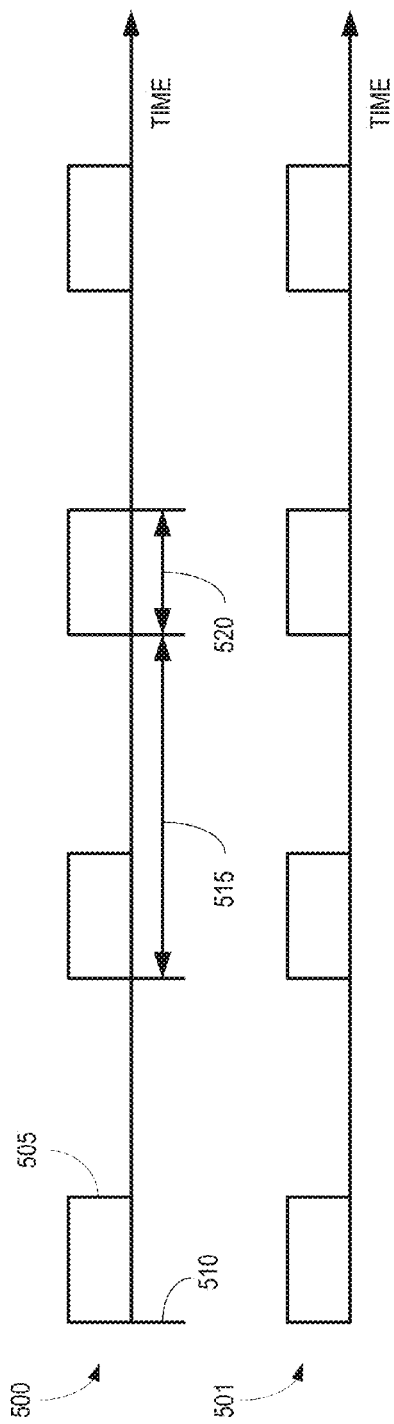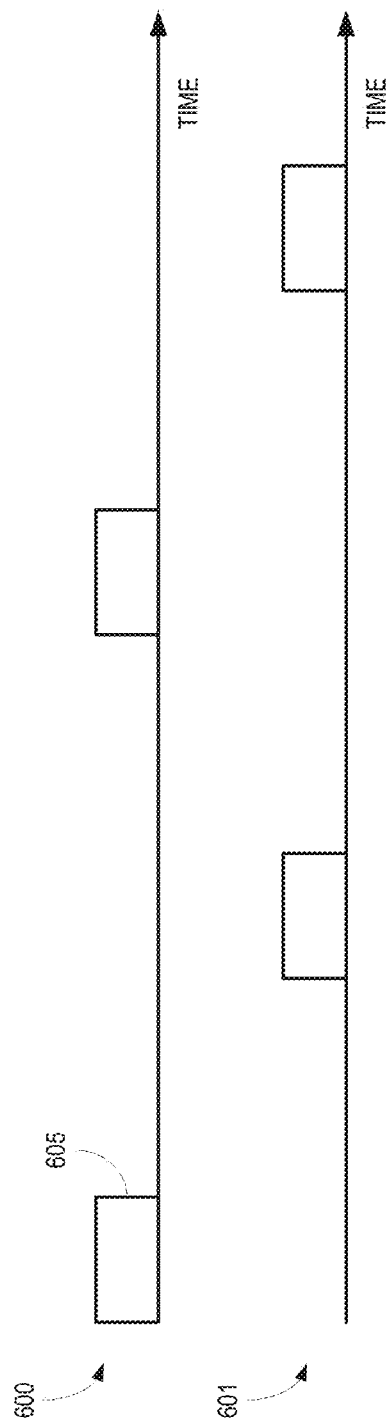

COORDINATING TRANSMISSION OF POSITIONING REFERENCE SIGNALS AND NON-REFERENCE SIGNALS

BACKGROUND

Field of the Disclosure

The present disclosure relates generally to wireless communication systems and, more particularly, to positioning reference signals transmitted in wireless communication systems.

Description of the Related Art

Heterogeneous wireless communication systems include base stations for providing wireless coverage within corresponding macrocells and may also include other small cells for providing wireless coverage in smaller regions that overlay the macrocells. The small cells may be referred to as access points, home base station routers, metrocells, microcells, femtocells, picocells, and the like. User equipment in the heterogeneous wireless communication system may be located using signals transmitted by the base stations. For example, the Observed Time Difference Of Arrival (OTDOA) technique uses the difference in arrival times of positioning reference signals (PRSs) transmitted by multiple base stations to a user equipment to estimate the location of the user equipment by multilateration. Base stations can transmit the PRS in one of a standardized set of configurations that are defined by a number of transmission time intervals (TTIs), a set of physical resource blocks (PRBs), and a set of periodicities. The configurations of the PRS are different for different service providers and particular configurations may be conveyed to user equipment when OTDOA measurements are requested of the user equipment.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided for coordinating transmission of positioning reference signals with transmission of non-reference signals. One embodiment of the method includes detecting, at a first base station, a reference signal transmitted by a second base station in one or more physical resource blocks. The method also includes identifying a pattern of resources allocated to the second base station based on the one or more physical resource blocks of the reference signal. The method further includes bypassing transmission of non-reference signals from the first base station in physical resource blocks indicated by the pattern.

In some embodiments, a base station is provided for coordinating transmission of positioning reference signals and non-reference signals. One embodiment of the base station includes a transceiver to detect a reference signal transmitted by one or more other base stations in one or more physical resource blocks. The base station also includes a processor to identify a pattern of resources allocated to the one or more other base stations based on the one or more physical resource blocks in one or more subframes including the one or more reference signals. The transceiver is to bypass transmission of non-reference signals in physical resource blocks indicated by the pattern.

In some embodiments, a non-transitory computer readable medium is provided for coordinating transmission of positioning reference signals and non-reference signals. One embodiment of the non-transitory computer readable medium embodies a set of executable instructions to manipulate one or more processors to detect a reference signal transmitted by a base station in one or more physical resource blocks and identify a pattern of resources allocated to the base station based on the one or more physical resource blocks including the reference signal. The set of executable instructions is also to manipulate the one or more processors to bypass transmission of non-reference signals in physical resource blocks indicated by the pattern.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 5 is a diagram of sequences of positioning reference signals (PRSs) transmitted by different base stations according to some embodiments.

FIG. 6 is a diagram of sequences of positioning reference signals (PRSs) transmitted by different base stations according to some embodiments.

DETAILED DESCRIPTION

Figure 1:
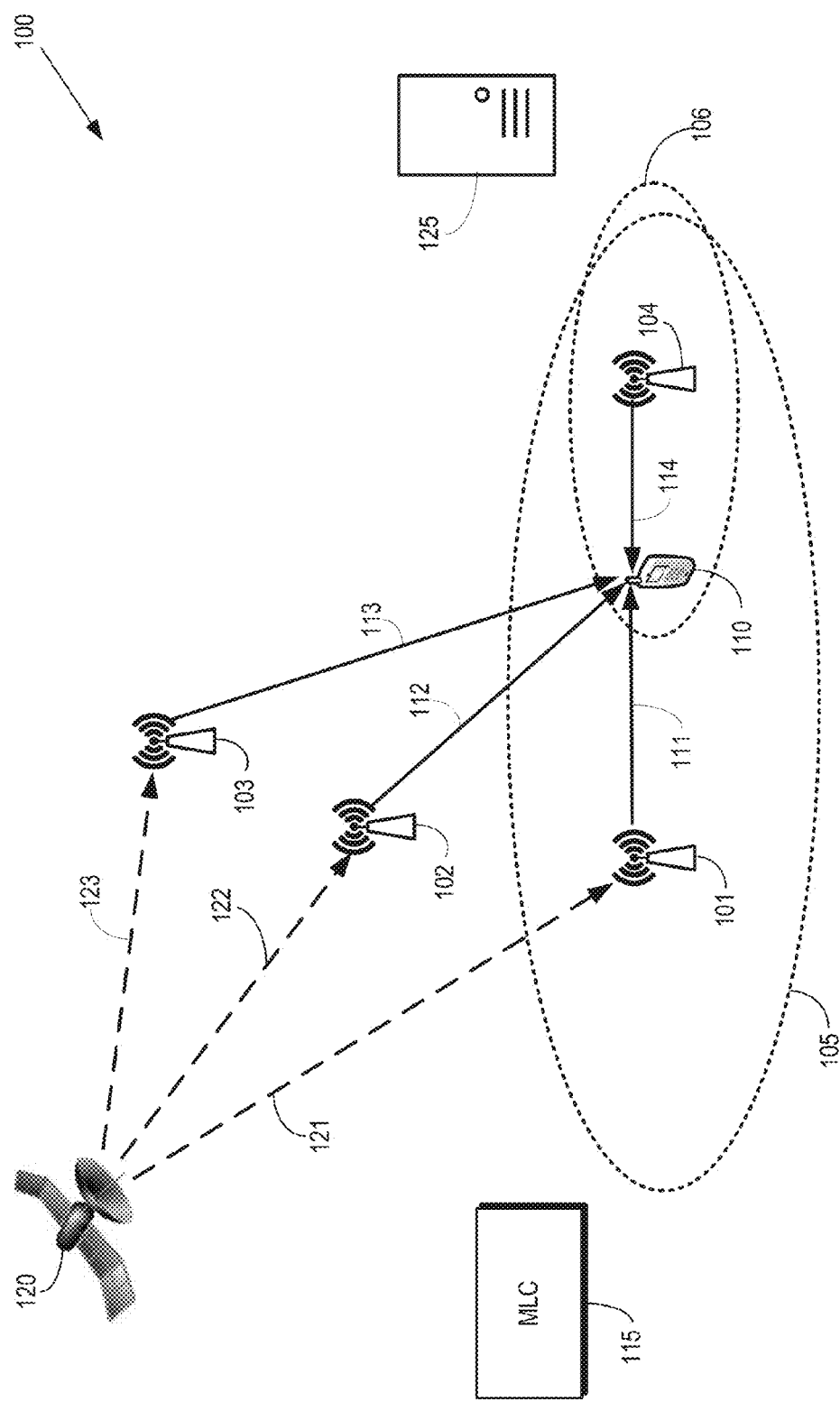
FIG. 1 is a block diagram of a wireless communication system according to some embodiments.

Some types of base stations (such as small cells) may not be able to provide PRSs to support OTDOA because they cannot meet the stringent OTDOA timing constraints on phase synchronization, delay measurements, and delay compensation. For example, U.S. Federal Communications Commission (FCC) requirements for the e911 service specify that an emergency caller's location be determined within an accuracy of at least 50 meter (m) for a yield of 67% of calls and an accuracy of at least 150 m for a yield of 90% of calls. To achieve the FCC-mandated accuracy, transmission times of downlink radio frames from antenna tips at different base stations should be synchronized within 100 nanosecond (ns) accuracy. Base stations within a macrocellular network synchronize to an external timing reference such as Global Positioning System (GPS) time of day so that the boundaries between TTIs and the corresponding system frame numbers (SFNs) for the different base stations are synchronized to within 100 ns accuracy. Small cells may not implement the complex hardware required to achieve 100 ns synchronization due to cost or other considerations. Moreover, even if a small cell implements the required hardware to synchronize to GPS time of day, the small cell may not have access to the configuration information needed to synchronize to the macrocellular base stations, particularly if the macrocellular base stations are implemented by a different vendor from the small cell base stations. Additionally, the GPS signal may be weak or completely obstructed for small cells in indoor deployments.

Transmissions of non-reference signals from small cells may even reduce the yield and accuracy of OTDOA calculations if they interfere with the PRSs transmitted by base stations that provide overlapping macrocellular coverage. For example, a small cell may be provided by a first equipment vendor and may provide radio frequency (RF) coverage to an area that overlaps a macrocellular RF coverage area provided by a base station that is provided by a second equipment vendor. Multiple equipment vendors may supply the small cells or the base stations that are deployed within the network of a single service provider. Even if all vendors use the same timing reference, the small cells and the base stations provided by the different vendors may use different proprietary algorithms to align their TTIs and SFNs to the timing reference. Consequently, the small cell may be unable to align its TTIs or SFNs to the TTIs or SFNs of the base stations even if the small cell has access to the timing reference. Thus, the small cell is unaware of the resources that have been allocated to the base station for transmission of PRS and may unknowingly transmit non-reference signals that interfere with the PRSs intended to be received by user equipment within the small cell coverage area, thereby degrading the ability of the user equipment to detect the PRSs and reducing the yield and accuracy of the OTDOA estimate of the location of the user equipment. To improve OTDOA performance it is desirable for all cells in the network to synchronize their PRS transmissions with each other and to avoid transmission of other non-reference signals during PRS occasions in order to minimize interference to the PRS.

Small cells can avoid transmitting non-reference signals that interfere with reference signals (such as PRSs) transmitted to user equipment by base stations in a heterogeneous wireless communication system by detecting reference signals transmitted by a base station, using the detected reference signals to identify a pattern of resources allocated to the base station for transmission of the reference signals, and bypassing transmission of non-reference signals during the resources indicated by the pattern. In some embodiments, base stations may mute a subset of their allocated resources so that the reference signals are not transmitted in the muted subset. The small cell may therefore identify one or more muted subsets based on detected reference signals transmitted by one or more base stations. Some embodiments of the small cell may bypass transmission of the non-reference signals in a non-muted portion of the allocated resources that is determined based on the one or more muted subsets. The small cell may transmit a reference signal or non-reference signals in a subset of the allocated resources that is complementary to the non-muted portion. The non-muted portion of the allocated resources may be determined by the small cell or by an external server using information provided by the small cell.

Bypassing transmission of non-reference signals may include blanking transmission during resources that overlap with the pattern of resources allocated to the base station for transmission of the reference signals. In some embodiments, the small cell may determine a timing offset by comparing boundaries of the TTIs of the detected PRSs to the boundaries of the TTI defined by the small cell's timing reference. The timing offset may then be used to phase align the boundaries of the small cell TTIs to the boundaries of the TTIs of the base stations. Some embodiments of the small cells may be able to phase align the TTI boundaries to within the accuracy target for OTDOA, e.g., an accuracy target of 100 ns. The small cells may therefore transmit the PRSs in the pattern of resources to improve the accuracy of the OTDOA location estimation. The process of detecting the reference signals and identifying the pattern of resources may be repeated periodically, on-demand, or in response to the small cell detecting a timing offset above a threshold indicating that timing of the small cell has drifted out of synchronization with the base station's timing reference. The small cell may also notify the network operator in response to detecting the timing offset larger than the threshold, and may adjust itself to regain alignment. Some embodiments of the small cells may defer adjustment of the alignment of their TTI boundaries until traffic or loading of the small cell is low to reduce or minimize the impact on user equipment that have active sessions with the small cell. For example, the small cell may phase align their TTI boundaries in response to the loading of the small cell falling below a threshold or at a time interval (such as overnight) when the loading of the small cell is expected to be relatively low.

FIG. 1 is a block diagram of a wireless communication system 100 according to some embodiments. The wireless communication system 100 includes a plurality of base stations 101, 102, 103, 104, which may be collectively referred to herein as "the base stations 101-104." Although four base stations 101-104 are shown in FIG. 1, some embodiments of the wireless communication system 100 may include additional base stations to provide wireless coverage through a larger geographic area. As used herein, the term "base station" is used to refer to entities that provide wireless coverage to a corresponding geographic area or cell. The term base station is therefore synonymous with terms such as eNodeB, base station router, small cell, access point, macrocell, macrocell, metrocell, femtocell, picocell, and the like. For example, the base stations 101-103 may be eNodeBs that provide wireless coverage to corresponding macrocells 105 (only one shown in FIG. 1 in the interest of clarity). The base station 104 may be a small cell that provides wireless coverage to a cell 106 that overlaps, at least partially, with the macrocell 105. The base stations 101-104 may communicate with one or more user equipment 110 over uplink channels or downlink channels of air interfaces 111, 112, 113, 114.

The wireless communication system 100 may provide emergency services to user equipment 110 that are served by the base stations 101-103 or other base stations. For example, base stations 101-103 that operate according to the Long Term Evolution-Frequency Division Duplex (LTE-FDD) standards support an e911 application to provide emergency services. The base stations 101-103 may therefore be required to locate the user equipment 110 placing the emergency call within a specified accuracy. For example, U.S. FCC requirements specify that an emergency caller's location be determined within 50 m accuracy for 67% of calls and 150 m accuracy for 90% of calls. Some embodiments of the wireless communication system 100 may use the Observed Time Difference of Arrival (OTDOA) techniques to determine locations of user equipment 110. For example, the user equipment 110 may measure time differences between synchronized signals, such as positioning reference signals (PRSs), transmitted by the base stations 101-103. The user equipment 110 may then report the measured time differences to a mobile location center (MLC) 115. The MLC 115 may use the measured time differences in combination with known position of the base stations 101-103 to estimate the location of the user equipment 110 using multilateration techniques.

The requirements of emergency location services set very tight constraints on phase synchronization, delay measurement, and compensation in the wireless communication system 100 because timing misalignment at the antennas of the base stations 101-103 directly translates into position error of the user equipment 110. Some embodiments of the wireless communication system 100 may require 100 ns accuracy (1 sigma) in synchronization between downlink radio frames being transmitted from antenna tips at the base stations 101-103. The base stations 101-103 may therefore be synchronized to an external timing reference and therefore to each other. Some embodiments of the wireless communication system 100 may include or have access to an external timing reference such as Global Positioning System (GPS), which is represented in FIG. 1 as a GPS satellite 120 that provides timing reference signals 121, 122, 123 (which are referred to collectively as "the timing reference signals 121-123") that can be used to synchronize the base stations 101-103. For example, the GPS timing reference signals 121-123 may be used to synchronize the base stations 101-103 so that boundaries between the subframes or transmission time intervals (TTIs) transmitted by the base stations 101-103 are aligned to within a predetermined tolerance, such as 100 ns. The GPS time of day derived from timing reference signals 121-123 may also be used to synchronize the system frame numbers assigned to the TTIs transmitted by the base stations 101-103.

Some embodiments of the PRS transmitted by the base stations 101-103 may be defined based on a reference signal sequence. For example, the reference signal sequence may be defined based on a slot number of a slot within a subframe of a radio frame and a symbol number within the slot. The reference signal sequence can be mapped to complex-valued modulation symbols used for reference signals transmitted by different antenna ports in timeslots of the radio frame. Subframes (or TTIs) may be configured to transmit the PRS in predetermined set of physical resource blocks in a predetermined number of consecutive downlink subframes at a predetermined periodicity. For example, the base stations 101-103 may transmit the PRS in 1-6 consecutive subframes with a periodicity of 160, 320, 640, or 1280 subframes. Some embodiments may also define a subframe offset (measured in subframes) or a PRS muting sequence, as discussed herein. The configuration used by the PRS may be chosen from a set of predetermined configurations. Examples of configurations of the PRS are found in the 3GPP Technical Specification 36.211, §6.10.4.

The base stations 101-103 may be configured to transmit the PRS using a configuration that is determined by a service provider or an equipment vendor. The user equipment 110 may also be configured to listen for the PRS transmitted by the base stations 101-103. However, in the illustrated embodiment, the base station 104 is not aware of the PRS configuration used by the base stations 101-103. For example, the base station 104 may be a small cell that is provided by a different vendor (or deployed by a different service provider) than the base stations 101-103 and the vendor or service provider may not have provided information indicating the PRS configuration to the vendor or service provider of the base station 104. For another example, the base station 104 may be a macrocellular eNodeB that is part of a different wireless communication system, provided by a different vendor, or deployed by a different service provider and consequently is unaware of the PRS configuration of the base stations 101-103. The base station 104 is therefore unable to determine when to transmit the PRS (e.g., using the same or overlapping resources with the base stations 101-103) and cannot participate in OTDOA with the user equipment 110.

Some embodiments of the base station 104 may unknowingly transmit non-reference signals that interfere with the reference signals transmitted by the base stations 101-103 because the base station 104 is unaware of the PRS configuration of the base stations 101-103. Transmission of the non-reference signals in resources that overlap with the resources used to transmit PRS by the base stations 101-103 may degrade the accuracy of the OTDOA location estimates performed on the basis of the reference signals transmitted by the base stations 101-103. As used herein, the term "non-reference signals" will be understood to include any signals or user data transmitted over the air interface that are not used by a receiving device as a reference signal for operations performed by the receiving device, such as a PRS used for measuring time delays for OTDOA. For example, non-reference signals may include user data transmitted on a downlink shared channel such as the physical downlink shared channel (PDSCH) defined by the Long Term Evolution (LTE) standards.

Some embodiments of the base station 104 may not be synchronized with the base stations 101-103. For example, the base station 104 may not implement the hardware required to synchronize with the base stations 101-103 on the basis of timing reference signals provided by the GPS satellite 120. Moreover, the GPS timing reference signals may be unavailable if the base station 104 is deployed indoors. For another example, as discussed herein, even if the base station 104 implements the required hardware to synchronize to the GPS timing reference 120, the base station 104 may not have access to the configuration information needed to synchronize to the base stations 101-103, particularly if the base stations 101-103 are provided by a different vendor than the base station 104.

The base station 104 may therefore "sniff" the air interface for reference signals transmitted by the base stations 101-103 so that the base station 104 can avoid or bypass transmitting non-reference signals that collide with the reference signals transmitted by the base stations 101-103. Some embodiments of the base station 104 may monitor the air interface for a predetermined time interval time interval (such as five seconds) and attempt to detect reference signals transmitted by the base stations 101-103 in one or more physical resource blocks (PRBs) of one or more subframes or TTIs during the monitoring time interval. For example, the base station 104 may attempt to decode different configurations of the PRS over a search space of PRBs in TTIs within the monitoring time interval. The base station 104 may then store information indicating the resources used by any PRS that are detected during the monitoring interval and use this information to identify a pattern of resources allocated to the base stations 101-103. The identified pattern may correspond to one of the predetermined PRS configurations and may reflect muting of the PRS by one or more base stations 101-103, as discussed herein.

Some embodiments of the base station 104 may be configured to monitor and decode PRS detected during the monitoring interval, as discussed herein. However, the base station 104 may provide this information to an external device such as a server 125 for determining the PRS configurations. For example, the base station 104 may provide the stored information indicating the pattern of resources allocated to the base stations 101-103 to the server 125, which may then determine the PRS configuration information the SFN offsets, PRS pattern, muting pattern, and the like. The server 125 may then provide information identifying a pattern representative of the determined PRS configuration to the base station 104.

The base station 104 can bypass transmission of non-reference signals in subsequent PRBs indicated by the pattern. Bypassing transmission of the non-reference signals includes blanking transmission in one or more resources corresponding to the PRBs indicated by the pattern or, in some embodiments, transmitting PRS in the PRBs indicated by the pattern. Some embodiments of the base station 103 may also use the detected reference signals to determine a time offset for aligning a timing reference used by the base station 104 with the timing reference used by the base stations 101-103, as discussed herein. The PRS configuration used by the base stations 101-103 typically remains the same over long time periods (such as days, months, or years) and so the pattern detected by the base station 104 during the monitoring time interval may enable the base station 104 to bypass transmission of non-reference signals for a correspondingly long period of time. However, the base station 104 may subsequently repeat the detection process and modify the pattern used to bypass transmission of non-reference signals based on the pattern of reference signals detected during the new iteration of the detection process, as discussed herein.

Figure 2:
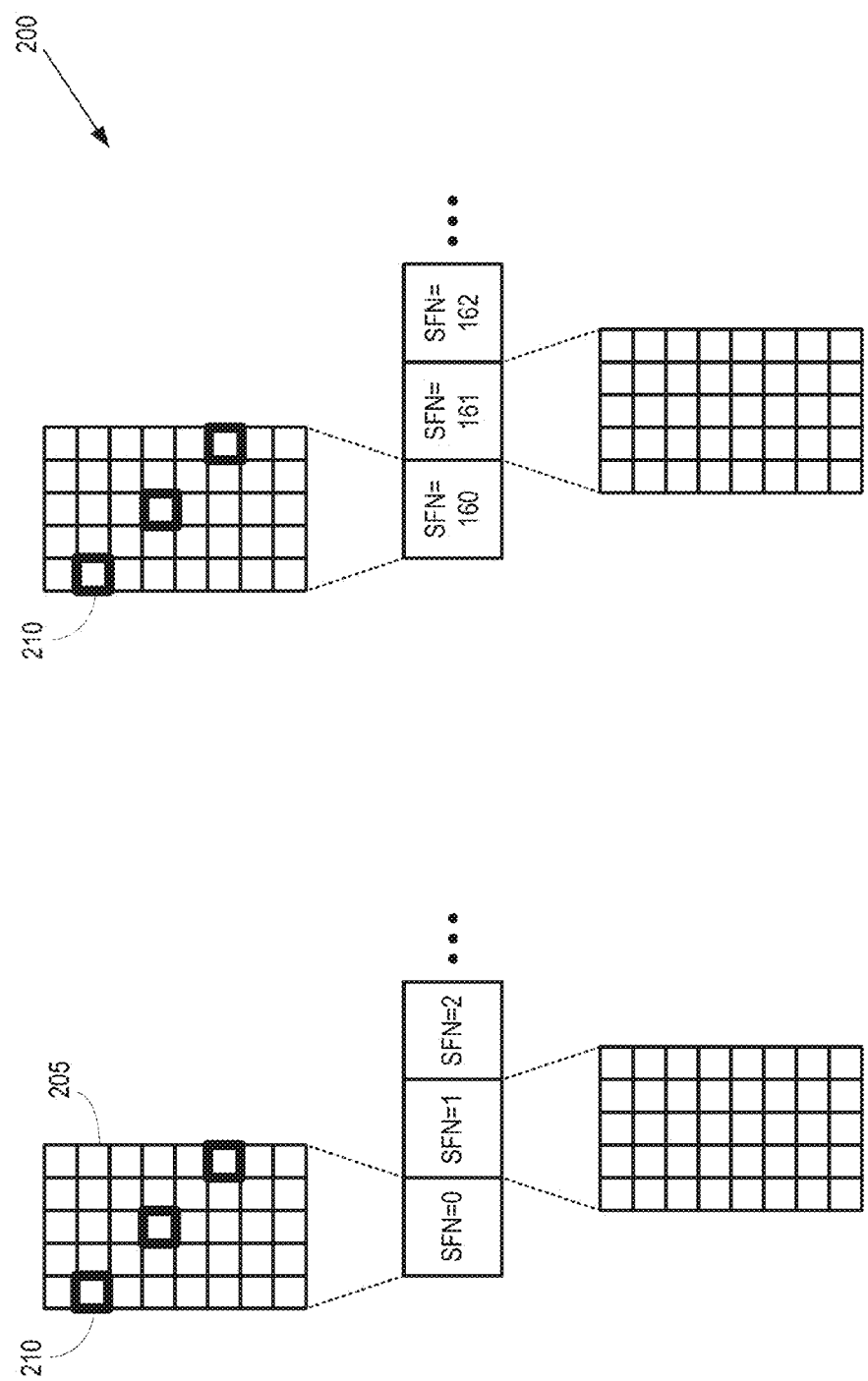
FIG. 2 is a diagram of an example of a sequence of transmission time intervals (TTIs) transmitted by a base station according to some embodiments.

FIG. 2 is a diagram of an example of a sequence 200 of subframes or TTIs transmitted by a base station according to some embodiments. The sequence 200 may be transmitted by a base station (such as one of the base stations 101-103 shown in FIG. 1) and may include reference signals that are used for location determination. The TTIs in the sequence 200 are labeled by corresponding system frame numbers (SFN). Another base station, such as the base station 104 shown in FIG. 1, may monitor the sequence 200 and attempt to detect reference signals in one or more PRBs in one or more of the TTIs of the sequence 200. In the illustrated embodiment, the TTIs in the sequence 200 include multiple resource elements. For example, the TTI indicated by the SFN=0 includes a plurality of resource elements 205 (only one indicated by a reference numeral in the interest of clarity). The resource elements 205 may be distinguished by a frequency or subcarrier (in the vertical direction) and a time interval or slot (and the horizontal direction).

A subset 210 (indicated by the boldface squares) of the resource elements 205 of the subframe or TTI indicated by the SFN=0 convey reference signals such as PRS that are used for location determination. The monitoring base station may detect the reference signals in the subsets 210, e.g., by successfully decoding the reference signals. Information identifying the subset 210 and the corresponding TTI may be stored by the monitoring base station. The monitoring base station may not detect any reference signals in the TTIs indicated by the SFN=1, 2, . . . because resource elements in these TTIs have not been allocated for transmission of reference signals. The monitoring base station may continue monitoring the sequence 200 and may subsequently detect reference signals in the subset 210 of the resource elements 205 of the TTI indicated by the SFN=160. The monitoring base station may store information identifying the subset 210 and the corresponding TTI. The monitoring base station may not detect any reference signals in the TTIs indicated by the SFN=161, 162, . . . because resource elements in these TTIs have not been allocated for transmission of reference signals. The monitoring time interval may then expire.

The monitoring base station may use the information identifying the detected reference signals to identify a pattern that indicates the resources allocated by the PRS configuration used by the transmitting base station. The pattern may be indicated by a subset of resource elements, a number of TTIs that reserve the subset of resource elements for transmission of PRS, and a periodicity of the resource element allocation. For example, the monitoring base station may determine that the PRS configuration allocates subset 210 of the resource elements of one TTI with a periodicity of 160 TTIs. The identified pattern may then be used to bypass transmission from the monitoring base station in subsequent resources corresponding to the resource elements 205 indicated by the pattern. For example, the monitoring base station may blank transmission in resource elements corresponding to the subset 210 in the TTIs indicated by SFN=320, 480, 640, 800, . . .

Figure 3:
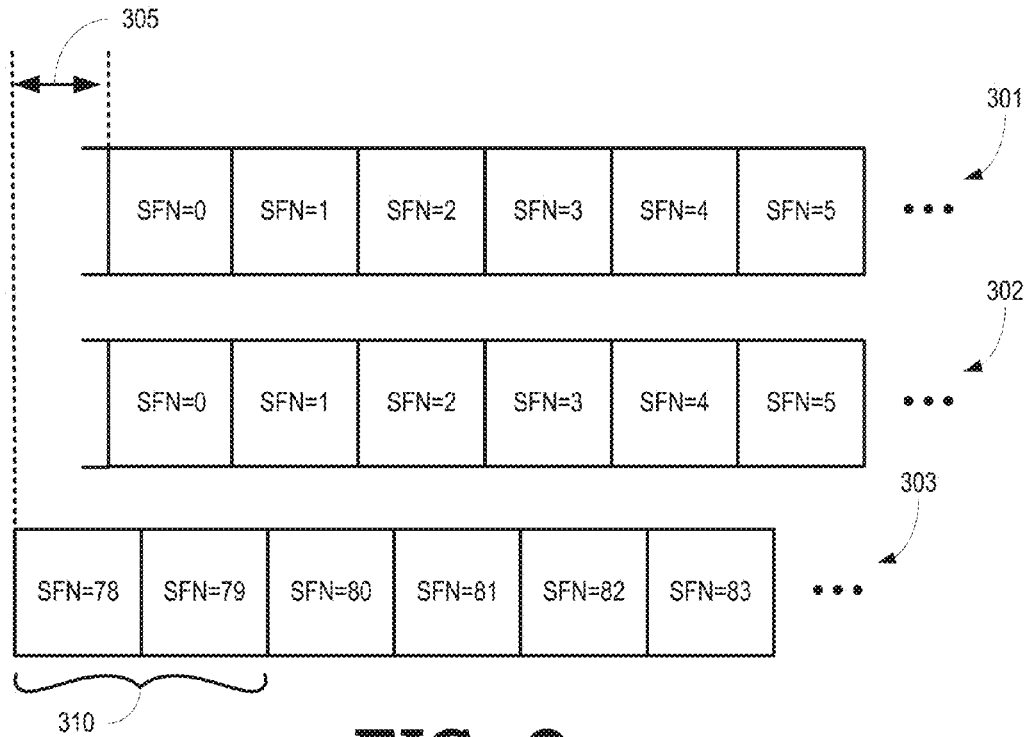
FIG. 3 is a diagram of three sequences of TTIs transmitted by corresponding base stations according to some embodiments.

FIG. 3 is a diagram of three sequences 301, 302, 303 of TTIs transmitted by corresponding base stations according to some embodiments. The sequences 301, 302, 303 may be transmitted by some embodiments of the base stations 101, 102, 103 shown in FIG. 1. The sequences 301, 302 are synchronized so that the boundaries of the TTIs are aligned in time. The system frame numbers (SFNs) are also aligned, e.g., the TTI corresponding to SFN=0 in the sequence 301 is aligned with the TTI corresponding to SFN=0 in the sequence 302. Alignment of the sequences 301, 302 may be achieved using an external timing reference such as a GPS timing reference and synchronization information exchanged between the corresponding base stations.

The sequence 303 is not synchronized with the sequences 301, 302 and consequently the boundaries of the TTIs in the sequence 303 are not aligned with the boundaries of the TTIs in the sequences 301, 302. Misalignment between the sequences 301, 302, 303 may be represented by a timing offset 305. The misalignment may result from using a different timing reference (e.g., the base station that transmits the sequence 303 may not have access to a GPS timing reference), a different way of deriving frame boundary from the timing reference, or because the base station transmitting the sequence 303 may not be able to access synchronization information from the base stations transmitting the sequences 301, 302. As discussed herein, the base station transmitting the sequence 303 may bypass transmission during resources that overlap with the resources allocated for transmission of reference signals by the base stations in the sequences 301, 302. For example, due to the timing offset 305, the base station may bypass transmission in resources of SFN=78 and SFN=79 (as indicated by the reference 310) of the sequence 303 that correspond to resources in SFN=0 of the sequences 301, 302 that are allocated for transmission of reference signals. The base station transmitting the sequence 303 may bypass transmission during all the PRBs in the subframes SFN=78 and SFN=79 or only in the PRBs indicated by a pattern corresponding to the detected pattern of reference signal transmissions. The timing offset 305 and resulting misalignment between the subframes in the sequences 301, 302, 303 may therefore reduce throughput of the base station that transmits the sequence 303 because some or all of the resources in two TTI are bypassed to avoid collision with reference signals transmitted in one TTI.

Figure 4:
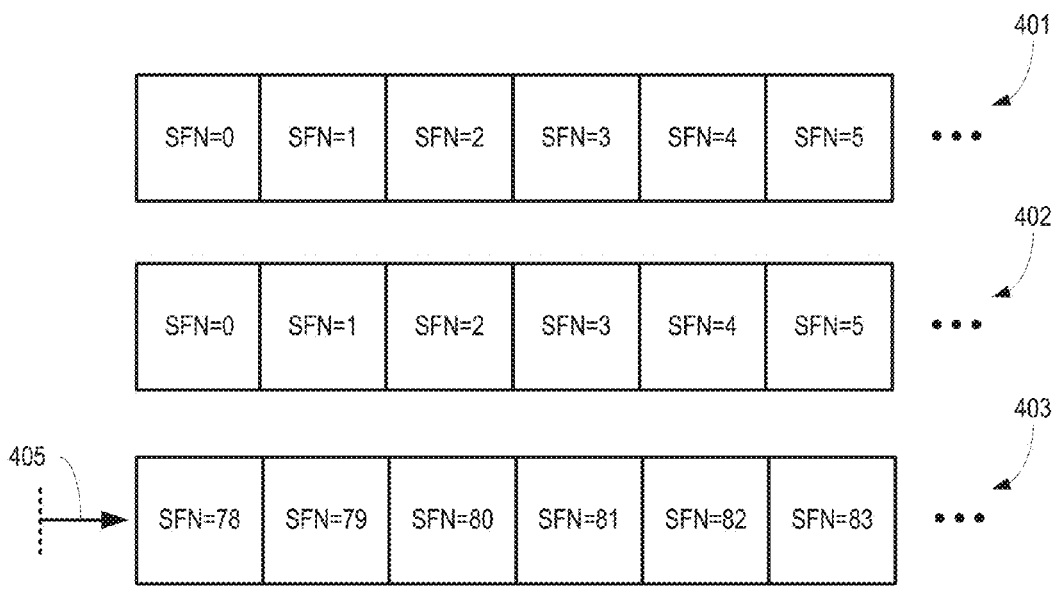
FIG. 4 is a diagram of three sequences of TTIs transmitted by corresponding base stations according to some embodiments.

FIG. 4 is a diagram of three sequences 401, 402, 403 of subframes or TTIs transmitted by corresponding base stations according to some embodiments. The sequences 401, 402, 403 may be transmitted by some embodiments of the base stations 101, 102, 103 shown in FIG. 1. The sequences 401, 402 are synchronized so that the boundaries of the TTIs are aligned in time. The system frame numbers (SFNs) are also aligned, e.g., the TTI corresponding to SFN=0 in the sequence 401 is aligned with the TTI corresponding to SFN=0 in the sequence 402. Alignment of the sequences 401, 402 may be achieved using an external timing reference such as a GPS timing reference and synchronization information exchanged between the corresponding base stations. Alignment of the sequences 401, 402 may also be achieved by applying a common algorithm (e.g., an algorithm shared by the base stations that transmit the sequences 401, 402) to the GPS timing reference to derive a common time for transmitting the subframe SFN=0 in the sequences 401, 402.

In the illustrated embodiment, the base station transmitting the sequence 403 has detected reference signals transmitted in resources of the sequences 401, 402. The base station has also determined a timing offset such as the timing offset 305 shown in FIG. 3. The base station may therefore align the boundaries of the TTIs of the sequence 403 to the boundaries of the TTIs of the sequences 401, 402 by applying a timing correction 405 that corresponds to the determined timing offset. Applying the timing correction 405 to align the boundaries of the sequences 401, 402, 403 may allow the base station to reduce the resources in the sequence 403 that are bypassed to prevent interference or collisions with reference signals transmitted in resources of the sequences 401, 402. In some embodiments, applying the timing correction 405 may synchronize the sequences 401, 402, 403 to within a tolerance that allows the base station to transmit reference signals in the sequence 403 with negligible interference to the reference signals in the sequences 401, 402.

Some embodiments of the base station transmitting the sequence 403 may trigger monitoring of the sequences 401, 402 to update the timing offset or the timing correction 405. For example, the base station transmitting the sequence 403 may trigger monitoring of the sequences 401, 402 transmitted by other base stations in response to the timing offset being above a threshold indicating that the boundary of the first transmission time interval is out of alignment with the boundary of the second transmission time interval. The base station transmitting the sequence 403 may then determine a new timing offset between the sequences 401, 402, 403, e.g., by comparing boundaries of subframes in the sequences 401, 402 to boundaries of the subframes in the sequence 403, as discussed herein.

The techniques described in FIG. 3 and FIG. 4 may be combined in some embodiments. For example, if the sequences 301, 302, 303 are out of alignment as shown in FIG. 3, a base station may defer adjustment of the phase alignment of subframes in the sequence 303 when the load on the base station is (or is expected to be) above a threshold to avoid an SFN reset that may result in the base station dropping all of its calls. The base station may therefore bypass transmission during all the PRBs in the subframes SFN=78 and SFN=79 of the sequence 303 (as described with regard to FIG. 3) to reduce interference with the PRS transmitted in SFN=0 in the sequences 301, 302. The base station may subsequently perform an SFN reset to apply the timing correction 405 (as described with regard to FIG. 4) in response to the load on the base station dropping below the threshold or during a time of day when the load on the base station is expected to be below the threshold.

FIG. 5 is a diagram of sequences 500, 501 of positioning reference signals (PRSs) 505 transmitted by different base stations according to some embodiments. In the interest of clarity, only one PRS 505 is indicated by a reference numeral in FIG. 5. The horizontal axis indicates time increasing from left to right. The sequences 501, 502 are synchronized so that the boundaries of the subframes or TTIs including the PRS are aligned in time and the sequences 501, 502 may be transmitted by some embodiments of the base stations 101, 102, 103 shown in FIG. 1. The sequences 501, 502 begin at a PRS offset 510 (measured in subframes), have a duration 515 (measured in subframes), and repeat with a periodicity 520 (measured in subframes). The base stations or cells that are transmitting the sequences 501, 502 identify by different physical cell identifiers (PCI) and consequently the PRS 505 in the sequences 501, 502 may collide in the time and frequency domain. The PRS 505 and one of the sequences 501, 502 may therefore interfere with or drown out the PRS 505 in the other one of the sequences 501, 502.

FIG. 6 is a diagram of sequences 600, 601 of positioning reference signals (PRSs) 605 transmitted by different base stations according to some embodiments. In the interest of clarity, only one PRS 605 is indicated by a reference numeral in FIG. 6. The horizontal axis indicates time increasing from left to right. The sequences 601, 602 are synchronized so that the boundaries of the subframes or TTIs including the PRS are aligned in time and the sequences 601, 602 may be transmitted by some embodiments of the base stations 101, 102, 103 shown in FIG. 1. The sequences 601, 602 differ from the sequences 501, 502 shown in FIG. 5 because the corresponding base stations mute complementary portions or subsets of the PRS 605. As used herein, the term "mute" indicates that the base station has been allocated resources for transmission of PRS but does not transmit a PRS in the muted portion or subset of the allocated resources. Although each sequence 601, 602 include fewer PRS 605, which on average increases the time between measurements of the PRS 605 performed by user equipment, the reduction in the number of PRS 605 may be outweighed by the benefit of decreasing the inter-PRS interference and increasing the probability that user equipment detect and decode each PRS 605 in the sequences 601, 602.

Small cells or other base stations (such as the base station 104 shown in FIG. 1) can detect the muting pattern used by the sequences 601, 602. The small cells may use the detected muting pattern to coordinate transmission of reference or non-reference signals with transmission of the PRS 605 in the sequences 600, 601. For example, the small cell may only bypass transmission of non-reference signals during a subset of subframes corresponding to the non-muted subsets of the PRS 605 in the sequences 600, 601. For another example, the small cells may transmit PRS during a subset of subframes corresponding to one or more of the muted subsets of the PRS 605 in the sequences 600, 601. The subset of subframes may be determined based on the muting patterns in the sequences 601, 602, as well as other measured parameters. For example, the small cell may detect a PRS pattern and one or more muting patterns in a group of sequences including the sequences 601, 602. The small cell (or other server using information provided by the small cell) may then select an optimized subset of the subframes that includes some or all of the PRS indicated by the PRS pattern. For example, if a first subset of the subframes indicated in the PRS pattern is being used by three or more base stations to transmit PRS and the muting patterns indicate that a second subset of the subframes are being muted by the same three or more base stations, the small cell may transmit reference signals (such as PRS) or non-reference signals in the second subset since the PRS transmitted in the first subset should be sufficient for OTDOA.

Figure 7:
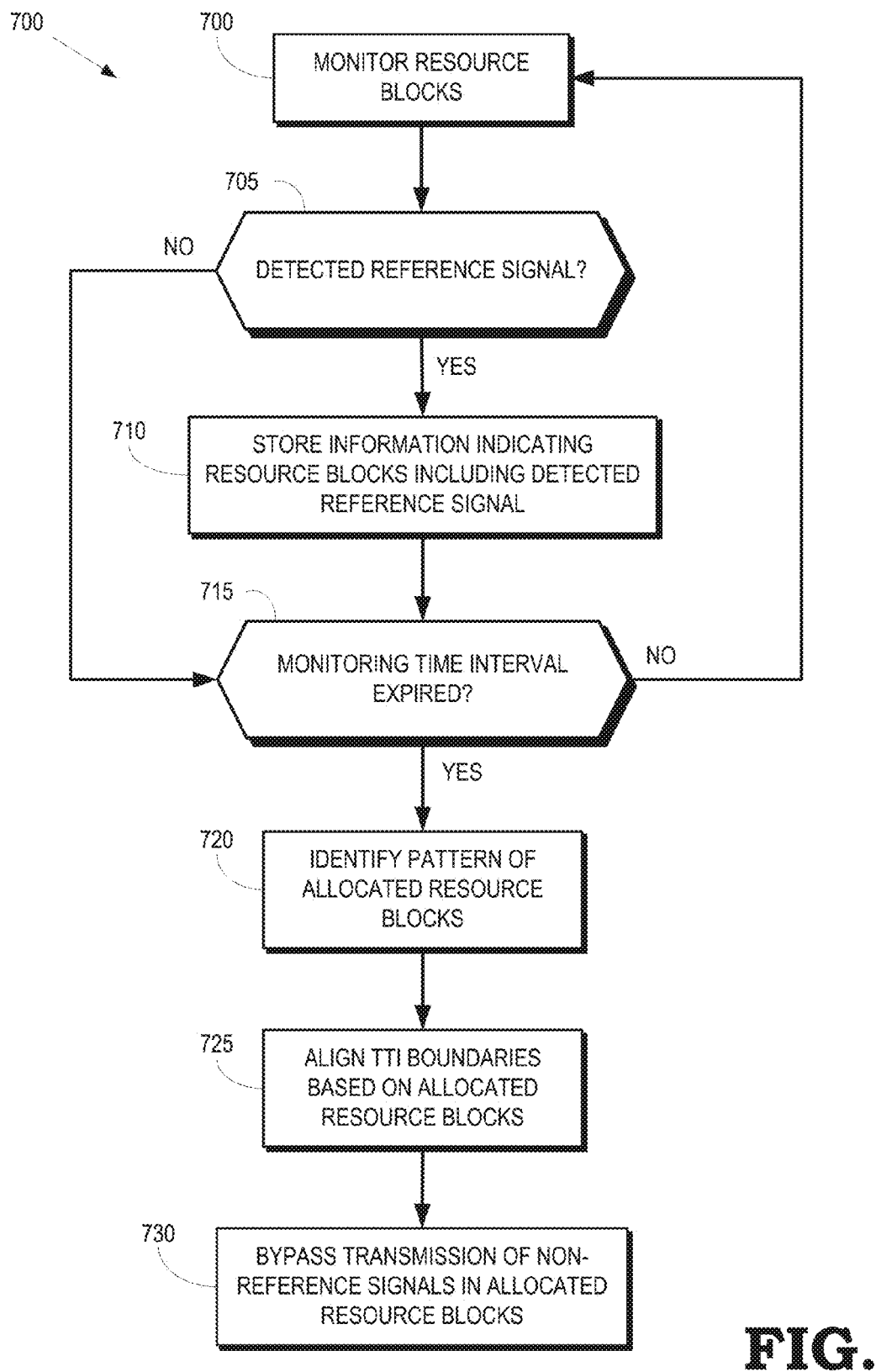
FIG. 7 is a flow diagram of the method for detecting reference signals and bypassing transmission of non-reference signals in resources allocated for transmission of the reference signals according to some embodiments.

FIG. 7 is a flow diagram of the method 700 for detecting reference signals and bypassing transmission of non-reference signals in resources allocated for transmission of the reference signals according to some embodiments. The method 700 may be implemented in some embodiments of the base station 104 shown in FIG. 1 or in a server that receives information from the base station. At block 705, the base station monitors resource blocks that may be used for transmission of reference signals by one or more other base stations, such as the base stations 101-103 shown in FIG. 1. For example, the base station may monitor the resource blocks that may be used for transmission of positioning reference signals (PRSs) by one or more other base stations that are performing OTDOA location estimation of one or more user equipment. At decision block 710, the base station determines whether a reference signal has been detected, e.g., by successfully decoding the reference signal. If so, the base station stores information indicating the resource blocks that include the detected reference signals at block 715. For example, the base station may store information indicating the indexes of the resource elements or physical resource blocks that include the reference signals, a system frame number identifying the subframe or TTI including the reference signals, and the like. The base station may continue to monitor the resource blocks if the base station does not detect any reference signals and the monitoring time interval has not expired.

At decision block 720, the base station determines whether the monitoring time interval has expired. If not, the base station continues to monitor resource blocks at block 705. Once the monitoring time interval has expired, the method 700 flows to block 725 and the base station identifies a pattern of resource blocks allocated for transmission of the reference signals by the other base stations. For example, the stored information indicating the resource blocks may be used to determine the subset of PRBs that are used to transmit reference signals in a TTI, the number of consecutive TTIs that are used to transmit the reference signals, and the periodicity between repetitions of the set of consecutive TTIs that are used to transmit the reference signals. For another example, the stored information may be used to determine a muting pattern used by one or more of the other base stations.

In some embodiments, the base station may align (at block 725) its TTI boundaries to the boundaries of the TTIs that are used to transmit the reference signals. For example, the base station may use the detected reference signals to determine a timing offset between the boundaries of the TTIs used by the other base stations to transmit the reference signals and the boundaries of the TTIs used by the base station, as discussed herein. The base station may then apply the timing offset to align (at block 725) the TTI boundaries.

At block 730, the base station bypasses transmission of non-reference signals in the allocated resource blocks, as indicated by the pattern (and the muting pattern, if detected) determined at block 720. As discussed herein, bypassing transmission of non-reference signals may include blanking transmission in resources corresponding to the allocated resource blocks. Bypassing transmission of non-reference signals may also include transmitting reference signals in resources corresponding to the allocated resource blocks in embodiments of the base station that are able to align the boundaries within a tolerance necessary for synchronization with the other base stations. Some embodiments of the base station may be able to configure themselves to transmit reference signals in the allocated resource blocks based on the stored information indicating the pattern of the allocated resource blocks.

Some embodiments of the method 700 may be performed periodically. For example, the base station may periodically initiate the method 700 according to a predetermined periodicity, such as once a week. Some embodiments of the method 700 may be performed on-demand in response to a request. For example, a service provider may transmit a request to the base station to perform the method 700 if the service provider determines that the PRS configuration used by other service provider's base stations has changed. Some embodiments of the method 700 may be performed to realign boundaries of the TTIs. For example, the method 700 may be performed in response to the base station detecting a timing offset above a threshold indicating that timing of the base station has drifted out of synchronization with the other base station's timing reference. The base station may also notify the network operator in response to detecting the timing offset larger than the threshold. The timing offset may be applied at a time determined based on traffic or loading of the base station. For example, the base station may phase align its TTI boundaries to the other base stations in response to the loading of the base station falling below a threshold or at a time interval (such as overnight) when the loading of the base station is expected to be relatively low.

Base stations in adjacent networks (such as at boundaries between service areas supplied by different base station vendors) may also be coordinated using embodiments of the method 700. Base stations in one of the networks may be identified as master base stations during an iteration of the method 700 and base stations in another one of the networks may be identified as slave base stations. The slave base stations may perform the method 700 to determine the resource allocation for the reference signals and configure themselves to bypass transmission of non-reference signals during the allocated resources. Some embodiments of the slave base stations may also align the boundaries of their TTIs to the boundaries of the TTIs of the master base stations. The slave base stations may subsequently take on the role of master base station for base stations in another network. Thus, transmissions of reference signals and non-reference signals from base stations in multiple networks may be coordinated and, in some embodiments, aligned or synchronized.

Figure 8:
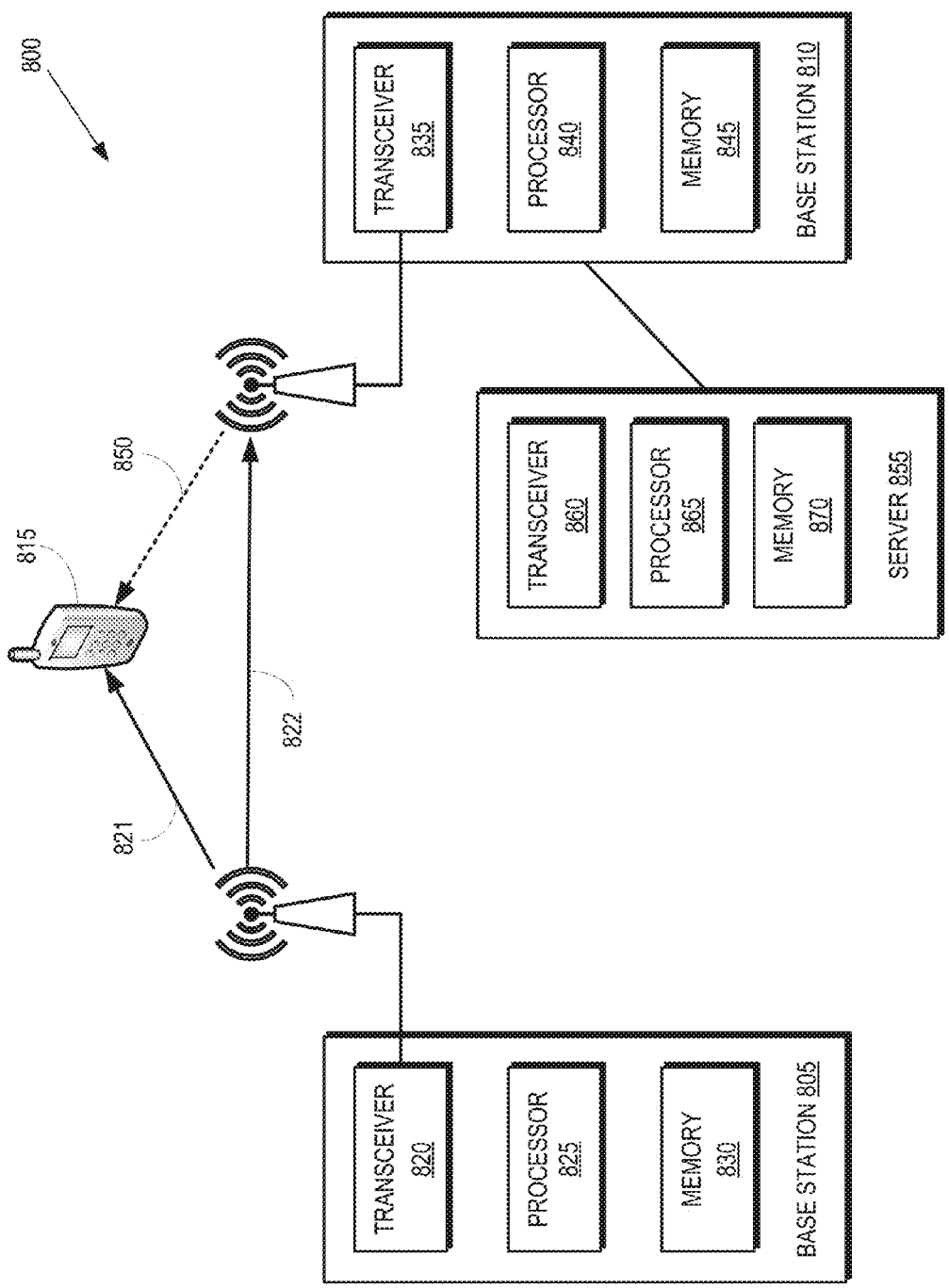
FIG. 8 is a block diagram of a wireless communication system according to some embodiments.

FIG. 8 is a block diagram of a wireless communication system 800 according to some embodiments. The wireless communication system 800 includes base stations 805, 810 and user equipment 815. Some embodiments of the base stations 805 may be used to implement one or more of the base stations 101-103 shown in FIG. 1. Some embodiments of the base station 810 may be used to implement the base station 104 shown in FIG. 1. Some embodiments of the user equipment 815 may be used to implement the user equipment 110 shown in FIG. 1.

The base station 805 includes a transceiver 820 for transmitting reference signals 821, 822 such as positioning reference signals used for OTDOA location estimation of the user equipment 815. The base station 805 also includes a processor 825 and a memory 830. The processor 825 may be used to execute instructions stored in the memory 830 and to store information in the memory 830 such as the results of the executed instructions.

The base station 810 includes a transceiver 835 for transmitting signals 850 that may include non-reference signals or reference signals such as positioning reference signals used for OTDOA location estimation of the user equipment 815. The signals 850 may also be blanked, as discussed herein. The base station 810 also includes a processor 840 and a memory 845. The processor 840 may be used to execute instructions stored in the memory 845 and to store information in the memory 845 such as the results of the executed instructions.

Some embodiments of the transceiver 835, the processor 840, or the memory 845 may be used to implement embodiments of the techniques described herein including techniques related to the method 700 shown in FIG. 7. For example, the transceiver 835 may detect resource elements used to transmit reference signals in the signal 822, as discussed herein. Information identifying the resource elements that include the reference signals may be stored in the memory 845. The processor 840 may then access the stored information from the memory 845 and use the stored information to identify patterns of resource elements allocated for transmission of the reference signals by the base station 805, as well as muting patterns used by the base station 805. The processor 840 may instruct the transceiver 835 to bypass transmission of non-reference signals in resource elements corresponding to the pattern. For example, the processor 840 may instruct the transceiver 835 to blank transmission in the resource elements corresponding to the pattern. Some embodiments of the processor 840 may use the stored information to identify a timing offset. The processor 840 may then instruct the transceiver 835 to apply the timing offset to align the boundaries of TTIs with the boundaries of TTIs transmitted by the base station 805. The transceiver 835 may then bypass transmission of non-reference signals by transmitting reference signals in the resource elements corresponding to the pattern, as indicated by the dashed arrow 850.

As discussed herein, some embodiments of the base station 810 may provide information identifying detected PRS to an external server 855 (such as the server 125 shown in FIG. 1) and the server 855 may perform some operations related to detecting transmission patterns for PRS or muting patterns. For example, the server 855 may include a transceiver 860, a processor 865, and a memory 870. The transceiver 860 may receive information provided by the base station 810 and the information may be stored in the memory 870. The processor 865 may access the information received from the base station 810 and use the received information to identify patterns of resource elements allocated for transmission of the reference signals by the base station 805, as well as muting patterns used by the base station 805. The processor 865 may then generate instructions that instruct the transceiver 835 to bypass transmission of non-reference signals in resource elements corresponding to the pattern. The instructions may be provided to the base station 810 by the transceiver 860 implemented in the server 855.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc , magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    detecting, at a first base station, a reference signal transmitted by a second base station in a plurality of physical resource blocks transmitted in at least one transmission time interval (TTI) during a monitoring time interval;

identifying a pattern of resources allocated to the second base station based on the plurality of physical resource blocks including the reference signal transmitted in the at least one TTI; and bypassing transmission of non-reference signals from the first base station in physical resource blocks indicated by the pattern.

2. The method of claim 1, wherein detecting the reference signal comprises decoding a positioning reference signal (PRS) transmitted by the second base station in the plurality of physical resource block.

3. The method of claim 1, wherein bypassing transmission of the non-reference signals from the first base station comprises blanking transmission in resources that overlap the physical resource blocks indicated by the pattern.

4. The method of claim 1, further comprising:
determining a timing offset by comparing a boundary of a first TTI used by the first base station to a boundary of a second TTI comprising the plurality of physical resource blocks transmitted by the second base station.

5. The method of claim 4, further comprising:
aligning the boundary of the first TTI to the boundary of the second TTI based on the timing offset.

6. The method of claim 5, wherein bypassing transmission of non-reference signals from the first base station in physical resource blocks indicated by the pattern comprises transmitting the reference signal from the first base station in the physical resource blocks indicated by the pattern.

7. The method of claim 4, further comprising:
triggering monitoring of transmission from the second base station in response to the timing offset being above a threshold indicating that the boundary of the first TTI is out of alignment with the boundary of the second TTI; and
determining a new timing offset by comparing a boundary of a third TTI used by the first base station to a boundary of a fourth TTI comprising the reference signal transmitted by the second base station.

8. The method of claim 1, wherein identifying the pattern of resources allocated to the second base station comprises identifying a muting pattern indicating that the second base station muted transmission of the reference signal during a subset of the pattern of resources, and wherein bypassing transmission of the non-reference signals comprises bypassing transmission of the non-reference signals from the first base station in physical resource blocks indicated by the pattern and the muting pattern.

9. An apparatus comprising:
a transceiver to detect a reference signal transmitted by at least one base station in a plurality of physical resource blocks transmitted in at least one transmission time interval (TTI) during a monitoring time interval; and
a processor to identify a pattern of resources allocated to the at least one base station based on the plurality of physical resource blocks including the reference signal transmitted in the at least one TTI, wherein the transceiver is to bypass transmission of non-reference signals in physical resource blocks indicated by the pattern.

10. The apparatus of claim 9, wherein the processor is to decode a positioning reference signal (PRS) transmitted by the at least one base station in the plurality of physical resource blocks.

11. The apparatus of claim 9, wherein the transceiver is to blank transmission in resources that overlap the physical resource blocks indicated by the pattern.

12. The apparatus of claim 9, wherein the processor is to determine a timing offset by comparing a boundary of a first TTI used by the transceiver to a boundary of a second TTI comprising the plurality of physical resource blocks transmitted by the at least one base station.

13. The apparatus of claim 12, wherein the transceiver is to align the boundary of the first TTI to the boundary of the second TTI based on the timing offset.

14. The apparatus of claim 13, wherein the transceiver is to transmit the reference signal in the physical resource blocks indicated by the pattern.

15. The apparatus of claim 13, wherein the transceiver is to trigger monitoring of transmission from the at least one base station in response to the timing offset being above a threshold indicating that the boundary of the first TTI is out of alignment with the boundary of the second TTI, and wherein the processor is to determine a new timing offset by comparing a boundary of a third TTI used by the transceiver to a boundary of a fourth TTI comprising the reference signal transmitted by the at least one base station.

16. The apparatus of claim 9, wherein the processor is to identify a muting pattern indicating that the at least one base station muted transmission of the reference signal during a subset of the pattern of resources, and wherein the transceiver is to perform at least one of transmitting reference signals or bypassing transmission of non-reference signals transmission in physical resource blocks indicated by the pattern and the muting pattern.

17. A non-transitory computer readable medium embodying a set of executable instructions, the set of executable instructions to manipulate at least one processor to:
detect a reference signal transmitted by a base station in a plurality of physical resource blocks transmitted in at least one transmission time interval (TTI) during a monitoring time interval;
identify a pattern of resources allocated to the base station based on the plurality of physical resource blocks including the reference signal transmitted in the at least one TTI; and
bypass transmission of non-reference signals in physical resource blocks indicated by the pattern.

18. The non-transitory computer readable medium of claim 17, wherein the set of executable instructions is to manipulate the at least one processor to:
determine a timing offset by comparing a boundary of a first TTI to a boundary of a second TTI comprising the plurality of physical resource blocks transmitted by the base station; and
align the boundary of the first TTI to the boundary of the second TTI based on the timing offset.

* * * * *